Oct. 18, 1932.  M. KING  1,883,796
MOUNTING FOR CAMERA FRAME YOKES
Filed Dec. 7, 1931
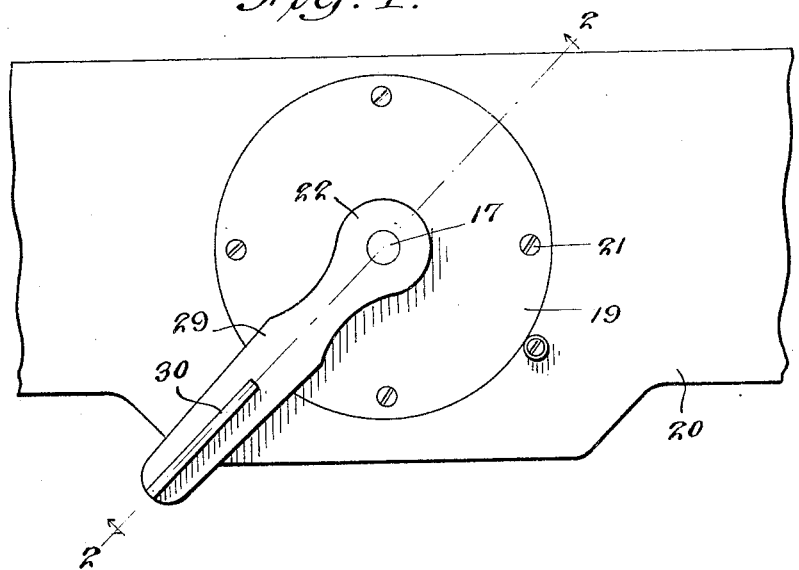
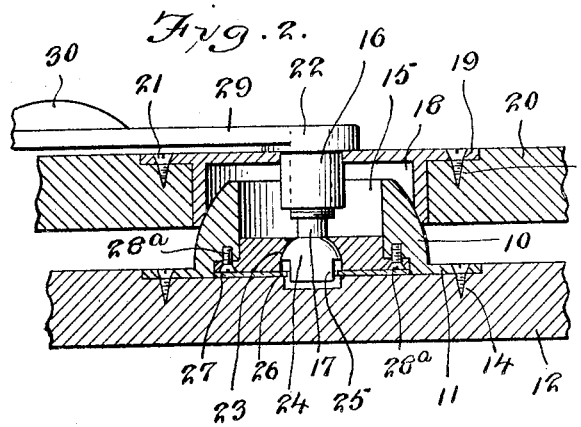
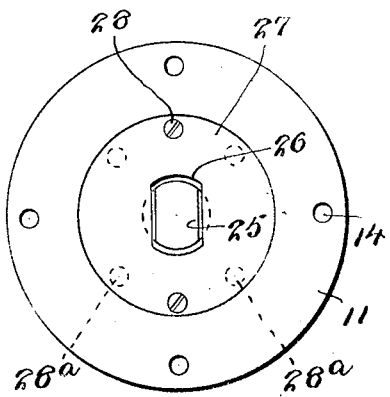
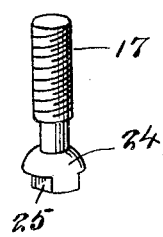
Melbert King
INVENTOR
BY Victor J. Evans & Co.
ATTORNEY Patented Oct. 18, 1932

1,883,796

UNITED STATES PATENT OFFICE

MELBERT KING, OF ALTOONA, PENNSYLVANIA

MOUNTING FOR CAMERA FRAME YOKES

Application filed December 7, 1931. Serial No. 579,599.

The object of the invention is to provide a mounting for the yokes of camera frames, whereby any position of angularity within ordinary range may be secured and effectively maintained; to provide a swivel mounting of the kind indicated capable of effective locking when adjustment has been secured, so that there may be no chance of disarrangement; and to provide a swivel mounting which is of simple form, limited to a minimum number of parts and of a kind that may be readily and cheaply manufactured.

With this object in view, the invention consists in a construction and combination of parts of which a preferred embodiment is illustrated in the accompanying drawing but to which embodiment the invention is not to be restricted, as continued use in practice may dictate certain changes or alterations which the right is claimed to make, insofar as they may be comprehended in spirit of the annexed claims.

In the drawing:

Figure 1 is a plan view of a mounting constructed in accordance with the invention.

Figure 2 is a sectional view on the plane indicated by the line 2—2 of Figure 1.

Figure 3 is a bottom plan view of the mounting detached from the base.

Figure 4 is a perspective view of the clamp screw.

The base member 10 of the mounting constituting the invention is in the form of a boss having the contour of the zone of a sphere but formed with a peripheral flange 11 by means of which it is secured to the camera carriage 12 through the medium of screws 14 which pass through the flange and thread into the carriage. The boss is hollowed out on the inner face as indicated at 15 to provide a clearance space for the nut 16 and clamp screw 17, this being necessary since the nut and clamp screw assume other positions than the vertical in certain adjustments of the device.

The cap member 18 of the mounting is of annular form with a peripheral flange 19 by means of which it is secured to the yoke 20 by means of screws 21 passing through the flange.

The annular flange member 21 of the cap 18 bears at its free edge on the spherical surface of the base member 10, while the cap member at the center has a clearance hole for the passage of the nut 16, the head portion 22 of the nut forming a shoulder with the body portion, which shoulder bears on the upper face of the cap member 18.

The web 23 of the base member is formed with a center hole which is countersunk from the under face of the base member to a spherical contour to provide a universal bearing for the head 24 of the screw 17. By this construction, the head of the screw has a firm bearing in the web portion of the base member in any of the angular positions which it may assume with respect to the base member.

To provide against angular or turning movement of the screw when the nut 16 is tightened, the screw head is formed with a diametrical flat portion 25 which seats in a slot 26 in a plate 27 which is seated in a counterbore on the under face of the base member and secured to the latter by means of the screws 28. The web portion 23 is in the form of an insert retained in place by means of the screws 28a.

The nut 16 is provided with a radially extending handle portion 29 at the free extremity of which and on one face is formed a thumb leaf 30. This so that the nut may be readily turned.

When the nut is screwed down on the screw 17, the head portion is brought into firm binding engagement with the cap member 18 and the head of the screw is seated firmly in the countersink of the web portion of the base member. The annular flange of the cap member therefore bears on the spherical circle of the base member and the adjustment is effectively maintained. Loosening the nut 16 will permit the cap member and with it the yoke 20 to which it is connected, to be shifted to any angular position within the range of adjustment, after which the tightening of the nut through the instrumentality of the handle 29 will effect binding engagement of the mounting with the resultant retention of the adjustment.

The invention having been described, what is claimed as new and useful is:

1. A mounting of the kind indicated comprising a base member of any spherical contour, a cap member having an annular flange for bearing engagement with the base member, and clamping means carried respectively by the base member and cap member for binding the annular flange of the latter on the spherical surface of the former, the clamping means consisting of a screw having a universal mounting in the base member and a nut engaging the screw and rotatably mounted in the cap member, the nut having a head forming a shoulder with the body of the screw, said shoulder bearing on top of the cap portion.

2. A mounting of the kind indicated comprising a base member of any spherical contour, a cap member having an annular flange for bearing engagement with the base member, and clamping means carried respectively by the base member and cap member for binding the annular flange of the latter on the spherical surface of the former, the clamping means consisting of a screw having a universal mounting in the base member and a nut engaging the screw and rotatably mounted in the cap member, the nut having a head forming a shoulder with the body of the screw, said shoulder bearing on top of the cap portion, the universal mounting for the screw comprising a spherical-like head seated in a correspondingly formed countersink in the web portion of the base member, the head of the screw being formed with a flat portion, and a plate secured to the base member and having a slot in which said flat portion is loosely engaged to prevent angular or turning movement of the screw with respect to the base member.

In testimony whereof I affix my signature.

MELBERT KING.